United States Patent
Shanbhag (10) Patent No.: US 9,208,044 B2
(45) Date of Patent: Dec. 8, 2015

(54) METHODS FOR SIMULATING MESSAGE-ORIENTED SERVICES AND DEVICES THEREOF

(71) Applicant: Infosys Limited, Bangalore (IN)

(72) Inventor: Ramanath Narayan Shanbhag, Mumbai (IN)

(73) Assignee: Infosys Limited, Bangalore (IN)

( * ) Notice: Subject to any disclaimer, the term of this patent is extended or adjusted under 35 U.S.C. 154(b) by 392 days.

(21) Appl. No.: 13/918,008

(22) Filed: Jun. 14, 2013

(65) Prior Publication Data

US 2013/0346804 A1    Dec. 26, 2013

(30) Foreign Application Priority Data

Jun. 25, 2012    (IN) .............. 2496/CHE/2012

(51) Int. Cl.
| | |
|---|---|
| *G06F 11/36* | (2006.01) |
| *G06F 11/26* | (2006.01) |
| *G06F 11/07* | (2006.01) |
| *G06F 11/30* | (2006.01) |
| *G06F 11/263* | (2006.01) |

(52) U.S. Cl.
CPC .......... *G06F 11/263* (2013.01); *G06F 11/0766* (2013.01); *G06F 11/3086* (2013.01); *G06F 11/3684* (2013.01)

(58) Field of Classification Search
CPC .............. G06F 11/263; G06F 11/0766; G06F 11/3086
See application file for complete search history.

(56) References Cited

U.S. PATENT DOCUMENTS

| | | | |
|---|---|---|---|
| 7,219,279 B2 | 5/2007 | Chandra et al. | |
| 7,386,432 B1 | 6/2008 | Haakonsen et al. | |
| 7,533,012 B2 | 5/2009 | Walsh et al. | |
| 7,793,157 B2 | 9/2010 | Bailey et al. | |
| 7,954,091 B2 | 5/2011 | Li et al. | |
| 2005/0071422 A1* | 3/2005 | Booth et al. ................. | 709/203 |
| 2009/0007073 A1* | 1/2009 | Huang et al. ................. | 717/124 |
| 2009/0030926 A1* | 1/2009 | Aharoni et al. .............. | 707/102 |
| 2012/0059863 A1* | 3/2012 | Thomson et al. ............ | 707/805 |

* cited by examiner

*Primary Examiner* — Gabriel Chu
*Assistant Examiner* — Paul Contino
(74) *Attorney, Agent, or Firm* — LeClairRyan, a Professional Corporation (57) ABSTRACT

A method, non-transitory computer readable medium, and apparatus that obtains a request message in a hierarchical format. A set of flat request records is generated based on the request message wherein each flat request record includes at least a key and a value. Each flat request record is compared to a set of criteria records to generate one or more response sets wherein each criteria record includes at least a key, a value, and a response identifier and each response set includes one or more response identifiers. One or more rules are applied to the one or more response sets to identify one or more response identifiers. One or more responses corresponding to the one or more identified response identifiers are optionally assembled and form at least part of an output.

24 Claims, 3 Drawing Sheets

METHODS FOR SIMULATING MESSAGE-ORIENTED SERVICES AND DEVICES THEREOF

This application claims the benefit of Indian Patent Application Filing No. 2495/CHE/2012, filed Jun. 25, 2012, which is hereby incorporated by reference in its entirety.

FIELD

This technology generally relates to testing applications which are consumers of message-oriented services or functions or application programming interfaces ("APIs") and, more particularly, to methods and devices for simulating message-oriented services or functions or APIs with a simulation environment and without creating custom test stubs.

BACKGROUND

Testing of message-oriented services or functions or APIs, such as Web services or other event-driven computer programs or applications, generally requires interaction with a backend or enterprise system functional environment. The interaction of the message-oriented service is through an interface, such as one or more queries or inputs that are serviced by the backend system. However, such backend systems are rarely available to a developer or tester of applications which are consumers of such message-oriented services. The backend systems may not be available because they have not been developed yet, exist in a location not accessible by the developer or tester of the applications which consume the message-oriented services, and/or are not reliable due to being in an end-of-life phase and investments in those systems are restricted, for example. Additionally, it is often difficult, time-consuming, and costly to onboard backend systems and associated data in some testing environments.

Accordingly, functional or performance testing is often performed using test stubs which are computer program modules implemented to simulate the behavior of a message-oriented service through the interface and provide a response message as would otherwise be provided by the unavailable backend system. By simulating responses of backend systems to request messages, the test stubs abstract the functionality of the backend system(s) associated with the message-oriented service being tested or consumed. Accordingly, the test stubs are configured to provide a response irrespective of business or other logic typically provided by a backend system. Therefore, the test stubs are relatively less complex than corresponding portions of the backend systems and require fewer resources to implement in a testing environment.

However, custom stubs must be created for every interface due to the unique nature of each interface such as, for example, with respect to unique backend system queries and other interactions. Creating custom stubs for each message-oriented service is expensive and not extensible. Additionally, the process of creating the custom stubs is susceptible to error, adds an additional layer of complexity, and increases the project costs, which is undesirable in a testing environment.

SUMMARY

A method for simulating a message-oriented service includes initializing a state engine by obtaining, at a simulation computing apparatus, a request message and a response message, which are generally in a hierarchical format. A set of flat request records is generated, with the simulation computing apparatus, based on the request message wherein each flat request record includes at least a key and a value. Optionally, the response message may be split into a configurable number of sub-parts (which may be node levels in a hierarchical response, for example). Each flat request record is associated, with the simulation computing apparatus, to a set of response records based on either a complete response or the set of sub-parts to generate one or more associations of the flat request record and response sets, wherein each association forms a criteria record which includes at least a key, a value, and a response identifier associated with the response message or a response part identifier associated with each sub-part of the response message.

A method for simulating a message-oriented service includes obtaining, at a simulation computing apparatus, a request message in a hierarchical format. A set of flat request records is generated, by the simulation computing apparatus, based on the input request message wherein each flat request record includes at least a key and a value. The state engine is queried for each of the generated flat request records, to obtain, at the simulation computing apparatus, the set of response identifiers or response part identifiers from the stored set of criteria records, the key and value of which are matching with the generated flat request records from the input request message. One or more rules are applied, by the simulation computing apparatus, to the one or more response sets to identify one or more response identifiers or response part identifiers. One or more test data responses corresponding to the one or more identified response identifiers or response-part identifiers are retrieved by the simulation computing apparatus. One or more response messages including the one or more retrieved test data responses are assembled together and are output, by the simulation computing apparatus.

A non-transitory computer readable having stored thereon instructions for simulating a message-oriented service comprising machine executable code which when executed by a processor, causes the processor to perform steps including initializing a state engine by obtaining a request message and a response message, which are generally in a hierarchical format. A set of flat request records is generated based on the request message wherein each flat request record includes at least a key and a value. Optionally, the response message may be split into a configurable number of sub-parts (which may be node levels in a hierarchical response, for example). Each flat request record is associated to a set of response records based on either a complete response or the set of sub-parts to generate one or more associations of the flat request record and response sets, wherein each association forms a criteria record which includes at least a key, a value, and a response identifier associated with the response message or a response part identifier associated with each sub-part of the response message.

A non-transitory computer readable having stored thereon instructions for simulating a message-oriented service comprising machine executable code which when executed by a processor, causes the processor to perform steps including obtaining a request message in a hierarchical format. A set of flat request records is generated based on the input request message wherein each flat request record includes at least a key and a value. The state engine is queried for each of the generated flat request records, to obtain the set of response identifiers or response part identifiers from the stored set of criteria records, the key and value of which are matching with the generated flat request records from the input request message. One or more rules are applied to the one or more response sets to identify one or more response identifiers or response part identifiers. One or more test data responses corresponding to the one or more identified response identifiers or response-part identifiers are retrieved. One or more response messages including the one or more retrieved test data responses are assembled together and are output.

An apparatus includes a processor coupled to a memory and configured to execute programmed instructions stored in the memory including initializing a state engine by obtaining a request message and a response message, which are generally in a hierarchical format. A set of flat request records is generated based on the request message wherein each flat request record includes at least a key and a value. Optionally, the response message may be split into a configurable number of sub-parts (which may be node levels in a hierarchical response, for example). Each flat request record is associated to a set of response records based on either a complete response or the set of sub-parts to generate one or more associations of the flat request record and response sets, wherein each association forms a criteria record which includes at least a key, a value, and a response identifier associated with the response message or a response part identifier associated with each sub-part of the response message.

An apparatus includes a processor coupled to a memory and configured to execute programmed instructions stored in the memory including obtaining a request message in a hierarchical format. A set of flat request records is generated based on the input request message wherein each flat request record includes at least a key and a value. The state engine is queried for each of the generated flat request records, to obtain the set of response identifiers or response part identifiers from the stored set of criteria records, the key and value of which are matching with the generated flat request records from the input request message. One or more rules are applied to the one or more response sets to identify one or more response identifiers or response part identifiers. One or more test data corresponding to the one or more identified response identifiers or response-part identifiers are retrieved. One or more response messages including the one or more retrieved test data responses are assembled together and are output.

This technology provides a number of advantages including methods, non-transitory computer readable medium, and devices that provide a simulation environment for message-oriented services or functions or APIs that is extensible, does not require availability of backend system(s), and is less error-prone than using custom test stubs. With this technology, developers and functional or performance testers can test applications consuming the message-oriented services or functions or APIs when backend system(s) are unavailable and without creating custom test stubs for each service or interface. As a result, fewer resources are required to produce and test the applications which are end consumers of these message-oriented services. Additionally, by not requiring error-prone test stubs, the message-oriented services, functions, and APIs can be tested with increased efficiency.

DETAILED DESCRIPTION

Figure 1:
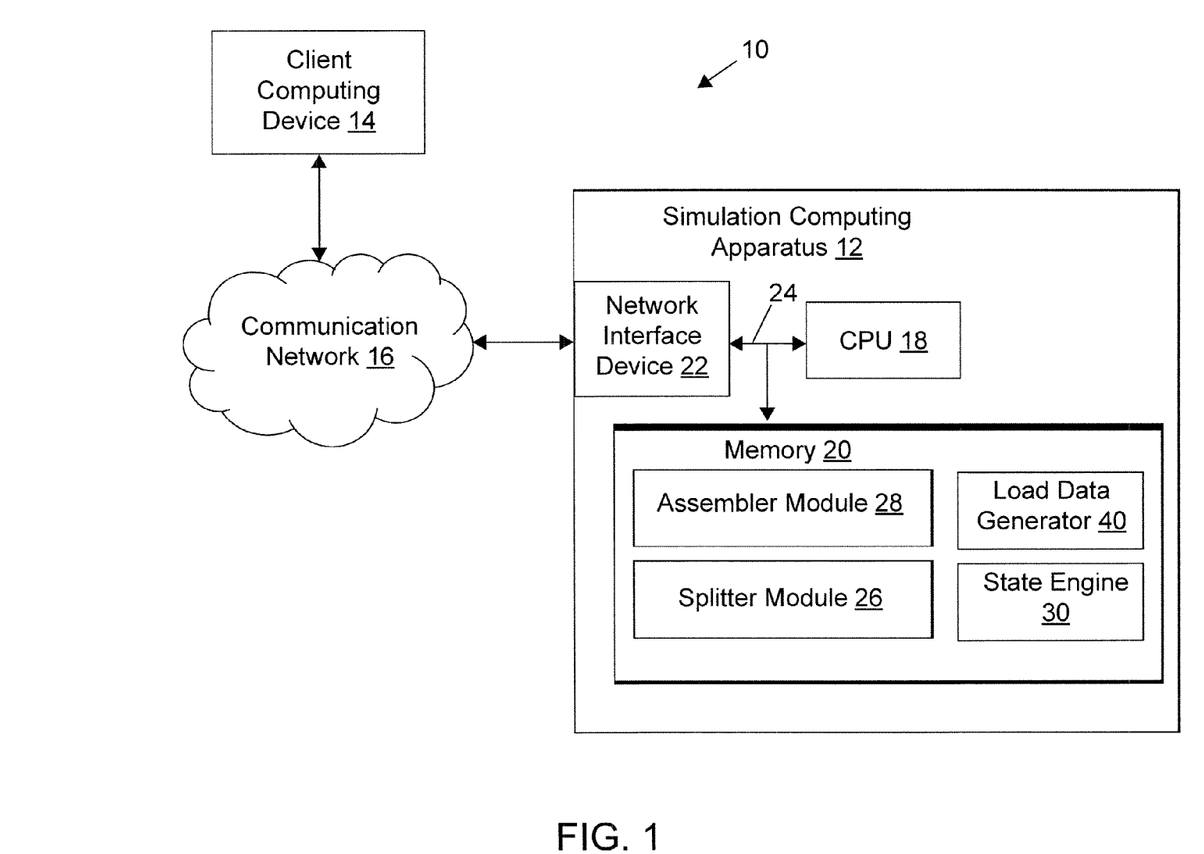
FIG. 1 is a block diagram of a network environment with an exemplary simulation computing apparatus.

A network environment 10 with an exemplary simulation computing apparatus 12 is illustrated in FIG. 1. The environment 10 includes the simulation computing apparatus 12 and a client computing device 14, coupled together by one or more communication networks 16, although this environment 10 can include other numbers and types of systems, devices, components, and elements in other configurations, such as multiple numbers of each of these apparatuses and devices. This technology provides a number of advantages including methods, non-transitory computer readable medium, and devices that more effectively provide a simulation or testing environment for services, such as message-oriented or Web services.

The simulation computing apparatus 12 includes a central processing unit (CPU) or processor 18, a memory 20, and a network interface device 22 which are coupled together by a bus 24 or other link, although other numbers and types of systems, devices, components, and elements in other configurations and locations can be used. The processor 18 in the simulation computing apparatus 12 executes a program of stored instructions for one or more aspects of the present technology as described and illustrated by way of the examples herein, although other types and numbers of processing devices and logic could be used and the processor could execute other numbers and types of programmed instructions.

The memory 20 in the simulation computing apparatus 12 stores these programmed instructions for one or more aspects of the present technology as described and illustrated herein. However, some or all of the programmed instructions and database could be stored and/or executed elsewhere such as at the client computing device 14, for example. A variety of different types of memory storage devices, such as a random access memory (RAM) and/or read only memory (ROM) in the simulation computing apparatus 12 or a floppy disk, hard disk, CD ROM, DVD ROM, or other computer readable medium which is read from and written to by a magnetic, optical, or other reading and writing system that is coupled to the processor 18 in the simulation computing apparatus 12, can be used for the memory 20.

In one example, the network interface device 22 of the simulation computing apparatus 12 operatively couples and facilitates communication between the simulation computing apparatus 12 and the client computing device 14 via the communications network 16, although other types and numbers of communication networks or systems with other types and numbers of connections and configurations can be used. By way of example only, the communications network could use TCP/IP over Ethernet and industry-standard protocols, including HTTP, JMS, FTP, NFS, CIFS, SOAP, REST, XML, LDAP, and/or SNMP, although other types and numbers of communication networks, such as a direct connection, a local area network, a wide area network, each having their own communications protocols, can be used.

The client computing device 14 can include a central processing unit (CPU) or processor, a memory, a network interface device, and an input and/or display device interface, which are coupled together by a bus or other link, although other numbers and types of network devices could be used. The client computing device 14 may run interface applications or other services make requests for and/or send content and/or data to different applications or services provided by the simulation computing apparatus 12 via the communication network 16.

Although examples of the simulation computing apparatus 12 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
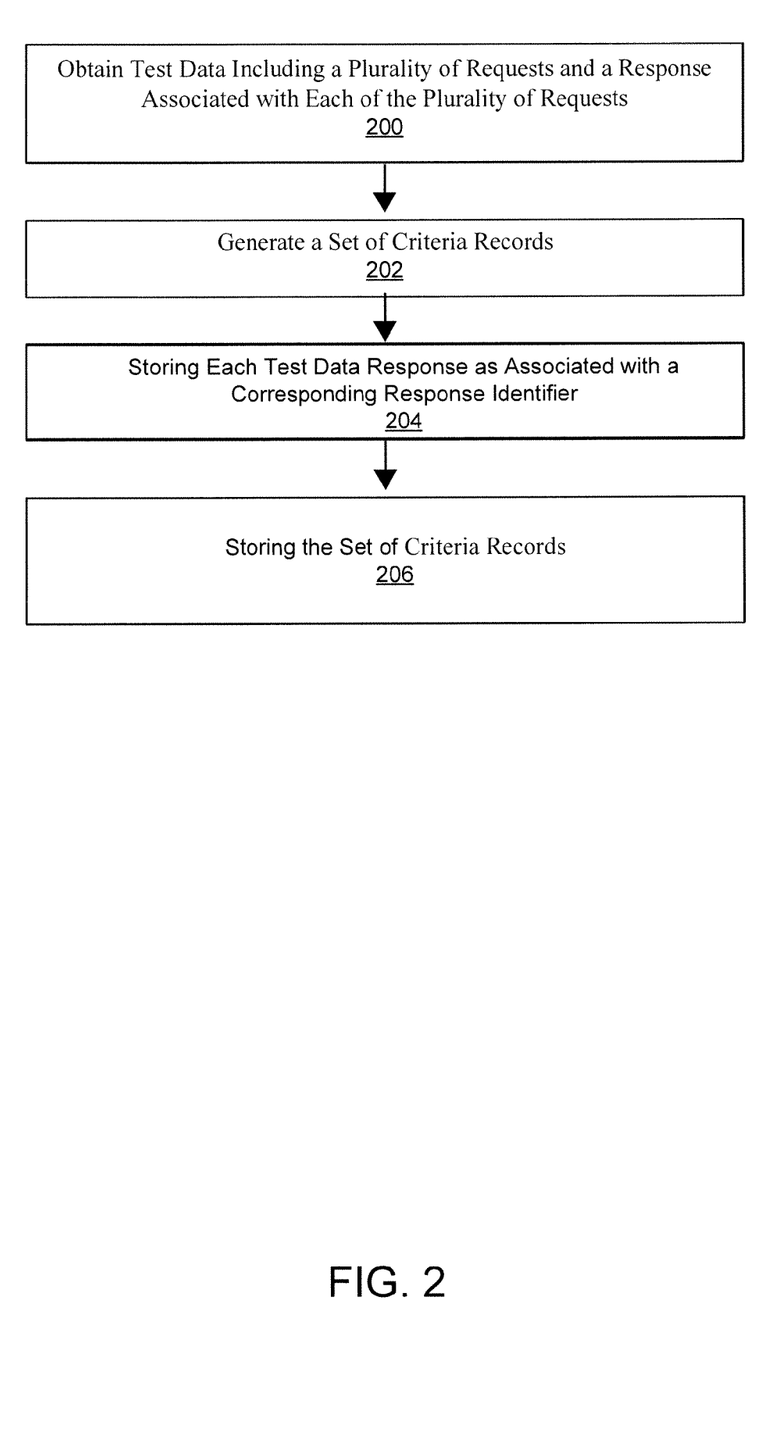
FIG. 2 is a flowchart of an exemplary method for obtaining test data.

An exemplary method for simulating a message-oriented service will now be described with reference to FIGS. 1-3. Referring specifically to FIG. 2, an exemplary method for obtaining test data using the simulation computing apparatus 12 is shown. In step 200, a splitter module 26 of the simulation computing apparatus 12 obtains test data including request/response pairs wherein at least the request is in a hierarchical format. The test data is used to provide responses to request messages output by the message-oriented service(s) being tested and, therefore, can be application-specific. Additionally, the test data can be input to the splitter module 26 by a user of the client computing device 14 using the communication network 16. In other example, alternatively or in combination, the test data can be generated based on a set of rules or criteria by a load data generator 40 of the simulation computing apparatus 12, particularly for purposes of performance testing. In other examples, alternatively or in combination, the test data can be generated by a network/protocol sniffer which monitors data over a network coming to an existing backend system under operation. The sniffer can also filter the request(s) and response(s) of the simulation computing apparatus 12, particularly for purposes of performance, functional, or business acceptance testing, although other manners for generating the test data can also be used.

Test data is obtained by the splitter module 26 in a hierarchical format which generally is used for request and response messages by message-oriented services and, therefore, is a cross-interface syntax. In one example, XML services utilize a hierarchical XML format for messaging. In another example, the J2EE object model also is hierarchical with respect to parent and child nodes of objects which represent a tree structure. Two exemplary request/response pairs of test data are shown in Table 1. The hierarchical format used in the test data shown in Table 1 is an eXtensible Markup Language (XML) format, although other hierarchical formats can also be used and the test data responses can be in a different format than the hierarchical format shown in Table 1.

TABLE 1

| Test Data Request | Test Data Response |
|---|---|
| <user> | <products> |
|   <identity> |   <product> |
|     <firstname>John</firstname> |     <id>Prod-1</id> |
|     <lastname>Doe</lastname> |     <price>50</price> |
|     <gender>M</gender> |   </product> |
|     <age>30</age> |   <product> |
|   </identity> |     <id>Prod-2</id> |
|   <status>Y</status> |     <price>100</price> |
| </user> |   </product> |
| | </products> |
| <user> | <products> |
|   <identity> |   <product> |
|     <firstname>Fannie</firstname> |     <id>Prod-1</id> |
|     <lastname>Mae</lastname> |     <price>20</price> |
|     <gender>F</gender> |   </product> |
|     <age>21</age> |   <product> |
|   </identity> |     <id>Prod-2</id> |
|   <status>Y</status> |     <price>40</price> |
| </user> |   </product> |
| | </products> |

Referring to Table 1, an exemplary message-oriented service consumer being tested can be configured to send a request message, such as the test data requests shown in Table 1, including name, gender, age, and/or status information. In response to the request message, when integrated, the associated backend system can be configured to provide a response message, such as the test data responses shown in Table 1, including the price of two products, the lower prices being associated with a gender input of "F" associated with a female gender.

Accordingly, a request message contains information for John Doe, a male having an age of 30 and an associated "Y" status, has an associated test data response containing price information for products Prod-1 and Prod-2 of 50 and 100, respectively. Similarly, another request message contains information for Fannie Mae, a female having an age of 21 and an associated "Y" status, has an associated test data response containing price information for products Prod-1 and Prod-2 of 20 and 40, respectively. In this example, the message-oriented service is configured to send a request message including personal information and the backend system being simulated is configured to process the request message and generate and send a response message including the price of two products based on the personal information. Alternatively, the backend system may return fault messages in response to the request message, in which case the fault message is simulated as another type of response message. To handle fault scenarios, the response message can be replaced by a fault message and the system would behave in the same manner and return the fault message. Accordingly, in some examples, the system treats the fault message as another type of response.

In step 202, the splitter module 26 generates a set of criteria records based on the request/response test data pairs. In order to generate the set of criteria records, the splitter module 26 is configured to parse the test data requests to generate a key associated with each of a plurality of paths or levels in the hierarchy of each test data request. In some examples, the key is in the form of a string and the plurality of paths for which a key is generated includes all possible paths in the hierarchy. Exemplary criteria records based on the test data requests of Table 1 are shown in Table 2.

TABLE 2

| Key | Value | Response Identifier |
|---|---|---|
| user/identity/firstname | John | Response List Price |
| user/identity/lastname | Doe | Response List Price |
| user/identity/gender | M | Response List Price |
| user/identity/age | 30 | Response List Price |
| user/status | Y | Response List Price |
| user/identity/firstname | Fannie | Response Discount |
| user/identity/lastname | Mae | Response Discount |
| user/identity/gender | F | Response Discount |
| user/identity/age | 21 | Response Discount |
| user/status | Y | Response Discount |

In the example shown in Table 2, each of the test data requests include a "<user> <identity> <firstname>" path which the splitter module 26 parses to generate the "user/identity/firstname" key. In this example, the splitter module 26 generates a key for all possible paths in the hierarchy of each test data request.

The splitter module 26 is further configured to parse each test data request in order to identify a value associated with each of the keys. Each of the values identified in each test data request are also included in one of the criteria records as associated with a corresponding one of the keys. In the example shown in Table 2, the "John" and "Fannie" values correspond to the "user/identify/firstname" key and are associated with that key in the respective criteria records.

In this example, the criteria records further include an indication of the test data response associated with the test data request with which the key and value of each criteria record is associated. Optionally, the indication is an identifier used in place of and to refer to the hierarchical format of the test data responses. Exemplary response identifiers for the test data responses shown in Table 1 are shown in Table 3.

TABLE 3

| Response Identifier | Test Data Response |
| --- | --- |
| Response List Price | \<products\><br>  \<product\><br>    \<id\>Prod-1\</id\><br>    \<price\>50\</price\><br>  \</product\><br>  \<product\><br>    \<id\>Prod-2\</id\><br>    \<price\>100\</price\><br>  \</product\><br>\</products\> |
| Response Discount | \<products\><br>  \<product\><br>    \<id\>Prod-1\</id\><br>    \<price\>20\</price\><br>  \</product\><br>  \<product\><br>    \<id\>Prod-2\</id\><br>    \<price\>40\</price\><br>  \</product\><br>\</products\> |

In this example, the "Response List Price" and "Response Discount" identifiers are associated by the splitter module 26 with a corresponding one of the test data responses, including each path included therein and each key and value pair determined based on each path. As shown in Table 2, the splitter module 26 is configured to include a response identifier in each generated criteria record. Accordingly, the response identifier in each criteria record corresponds to the test data response of the request/response test data pair on which the key and/or value of each criteria record is based.

In other examples, optionally one or more of the criteria records can include a plurality of response identifiers. In this example, each of the plurality of response identifiers corresponds to a portion of the test data response associated with the test data request on which the key and the value of the one or more criteria records are based. Exemplary response identifiers, each associated with a portion of one of the test data responses of Table 1, are shown in Table 4.

TABLE 4

| Response Identifier | Portion of Test Data Response |
| --- | --- |
| Part 0 | \<products\><br>\</products\> |

TABLE 4-continued

| Response Identifier | Portion of Test Data Response |
| --- | --- |
| Part 1 | \<product\><br>  \<id\>Prod-1\</id\><br>  \<price\>50\</price\><br>\</product\> |
| Part 2 | \<product\><br>  \<id\>Prod-1\</id\><br>  \<price\>100\</price\><br>\</product\> |

Also optionally, the value for one or more of the criteria records can include a regular expression pattern as included in the associated test data request. Accordingly, the value associated with the "user/identity/firstname" key in a criteria record can be "l[a-z]*" indicating that any first name beginning with the letter "l" is to be associated with the response identifier, and associated test data response, included in the criteria record. In another example, the value associated with the "user/identity/age" key in a criteria record can be "[0-1][0-9]|[2][0-5]" indicating that any age less than or equal to 25 is to be associated with the response identifier, and associated test data response, included in the criteria record. Such test data requests can be created by computer programs associated with the data load generator 40 or manually by the tester who is setting up the data in the simulation computing apparatus 12, for example. The test data requests can be created accommodate the plurality of requests that can be sent by the client computing device 14 or business rules associated with individual fields or combination of fields in the request. The regular expression patterns have been provided for exemplary purposes and the regular expressions can be any syntax capable of being parsed by the assembler module 28, as discussed in detail below.

If the optional response identifiers were used to represent the test data responses in the set of criteria records, in step 204, the simulation computing apparatus 12 stores each test data response, as associated with a corresponding one of the response identifiers in a database or a table such as shown in exemplary Tables 3 and 4. By storing the association of the test data responses and the response identifiers, the appropriate response message can be identified and output as described in detail below with respect to steps 306 and 308.

In step 206, the simulation computing apparatus 12 stores the set of criteria records in the memory 20, such as in a database or a table such as shown in the exemplary Table 2, although the records can be stored in other manners and locations.

Figure 3:
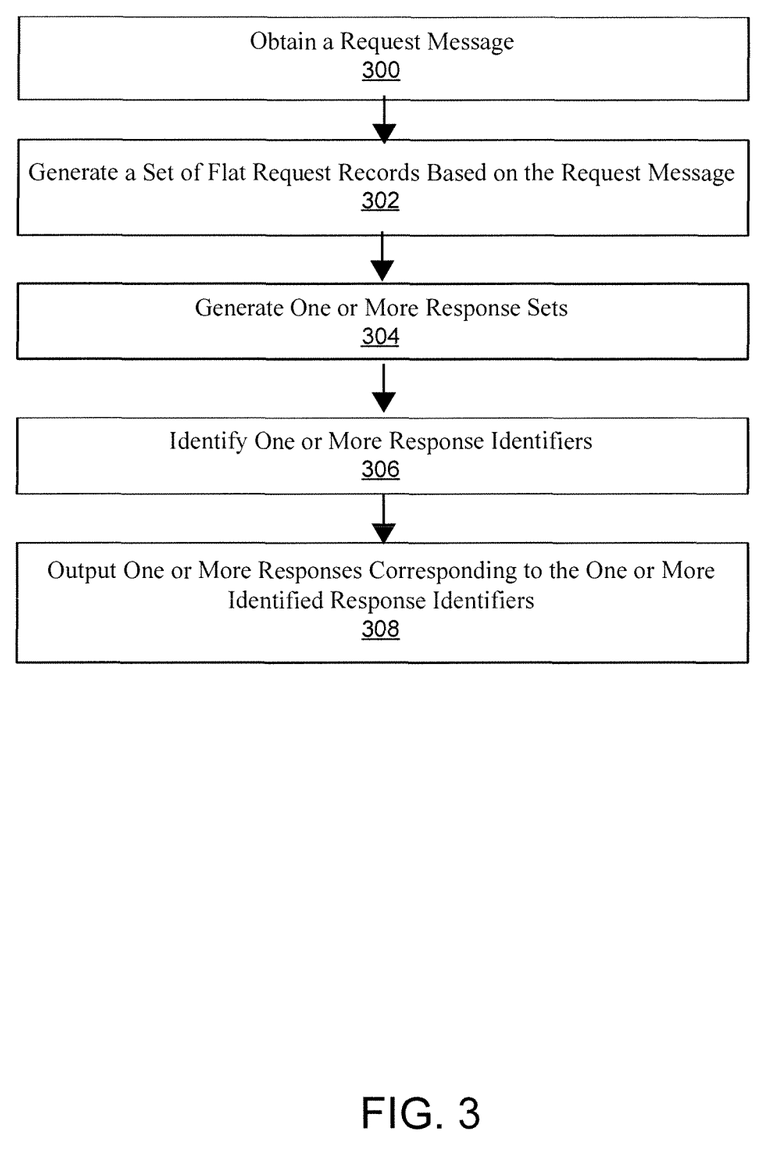
FIG. 3 is a flowchart of an exemplary method for simulating a message-oriented service.

Referring specifically to FIG. 3, an exemplary method for simulating a message-oriented service is shown. In step 300, the assembler module 28 of the simulation computing apparatus 12 obtains a request message in a hierarchical format from the client computing device 14 and specifically from an application invoking the message-oriented service being tested. The request message can be output by a message-oriented service or application operating on the client computing device 14 or the simulation computing apparatus 12, for example although the request message can be obtained in other manners from other sources. The message-oriented service can be any service application including any Web service configured to communicate based on hierarchical messages. Exemplary message-oriented services include an Enterprise Java Bean service, a Java (EJB) service, an eXtensible Markup Language (XML) service, a Representational State Transfer (REST) based service, a Web Service, a Java Message Service (JMS) service, a .Net service, although other message-oriented services can also be used.

In this example, the assembler module 28 is configured to simulate a backend system such that it intercepts request messages communicated by the message-oriented service being tested that would otherwise be communicated to a backend system if the message-oriented service was integrated with the backend system. The assembler module 28 can intercept the message through an endpoint listener implemented by a service bus or enterprise application integration (EAI) which is configured to receive request messages and communicate the request messages to the assembler module 28.

Accordingly, the simulation computing apparatus 12 does not require any knowledge of the interface for the message-oriented service, such as specific backend system queries or the type of message-oriented service from which the request message originated, for example. Instead, the simulation computing apparatus 12 provides a simulation environment capable of processing any messages output by a message-oriented service irrespective of the associated interface.

One exemplary request message includes the following request in a hierarchical XML format:

```
<user>
    <identity>
        <firstname>Ian</firstname>
        <lastname>Botham</lastname>
        <gender>M</ gender >
        <age>45</ age>
    <identity>
    <status>Y</status>
</user>
```

In step 302, the assembler module 28 generates a set of flat request records based on the request message obtained in step 300. In order to generate the set of flat request records, the assembler module 28 is configured to parse the request message to generate a key associated with each of a plurality of paths or levels in the hierarchy of the request message. In some examples, the key is in the form of a string and the plurality of paths for which a key is generated includes all possible paths in the hierarchy.

The assembler module 28 is further configured to parse the request message in order to identify a value associated with each of the keys. Each of the values identified in each test data request are also included in one of the flat request records as associated with a corresponding one of the keys. An exemplary set of flat request records including all possible key/value pairs for the exemplary request identified above is shown in Table 5.

TABLE 5

| Key | Value |
|---|---|
| user/identity/firstname | Ian |
| user/identity/lastname | Botham |
| user/identity/gender | M |
| user/identity/age | 45 |
| user/status | Y |

In step 304, the assembler module 28 generates one or more response sets based on each flat request record included in the set of flat request records (e.g. as shown in Table 5) and the set of criteria records (e.g. as shown in Table 2). Accordingly, in order to generate the response sets, each including one or more response identifiers, the assembler module 28 compares the key/value pairs of each flat request record generated in step 302 to the key/value pairs of each of the stored set of criteria records (as shown in Table 2 for example) to identify any matches. The assembler module 28 populates the response sets based on the response identifiers associated with each of the criteria records having a key/value pair matching one of the key/value pairs of one of the set of flat request records.

If one or more of the criteria records includes a value including a regular expression pattern, the assembler module 28 further determines whether any of the values of the key/value pairs of the set of flat request records, as generated in step 302, satisfies the regular expression of any value of any of the set of criteria records having a matching key. Accordingly, in examples in which one or more of the values of the criteria records includes a regular expression pattern, the assembler module 28 populates the one or more response sets with each response identifier of any flat request record having a key matching the key of a criteria record and a value satisfying the regular expression of the criteria record.

In the example shown in Tables 1-5, the key/value pair matches in Tables 2 and 5 include (user/identity/gender/, M) and (user/status, Y). The response identifier associated with the (user/identity/gender/, M) key/value pair in the set of criteria records is "Response List Price" and the response identifiers for the (user/status, Y) key/value pair in the set of criteria records are "Response List Price" and "Response Discount". Accordingly, the response sets returned for the matching key/value pairs in this example are ("Response List Price") and ("Response List Price", "Response Discount"). The remaining key/value pairs of the set of request records return empty response sets. Optionally, where multiple response identifiers, each referred to herein as a response part identifier, are provided in a criteria record, representing portions or sub-parts of a test data response, each response part identifier associated with a key/value pair match can be included in one or more of the response sets.

In step 306, the assembler module 28 identifies one or more response identifiers of the response sets based on one or more rules, although other manners for identifying the response identifiers could be used. The assembler module 28 applies one or more rules established or selected by a user of the simulation computing apparatus 12, although the rules could be established or otherwise obtained in other manners. One exemplary rule requires an exact match of the identifiers in all the response sets. Accordingly, in the example described above with respect to Tables 2 and 5, the assembler module 28 applying the exact match rule would not identify any response identifiers. Another exemplary rule requires determining any intersection of the one or more generated non-empty response sets.

Accordingly, in the example described above with respect to Tables 2 and 5, the assembler module 28 applying the intersection rule would identify the "Response List Price" identifier as that identifier is present in each of the non-empty response sets. The rules provided herein are for exemplary purposes and other rules can also be used including based on a Union or any other Set operation.

In step 308, the assembler module 28 outputs one or more responses corresponding to the one or more response identifiers identified in step 306. In one example, the assembler module 28 retrieves from the memory 20, such as from the state engine 30, for example, and outputs the test data responses corresponding to the one or more identified response identifiers. In other examples, the response message is assembled based on a plurality of response part identifiers and from the parts of the test data response included in one or more of the criteria records, which can be string value(s) from which the assembler can reproduce an XML or other hierarchical message.

Additionally, if the assembler module 28 does not identify any response identifiers in step 306, and/or the response sets are empty, the assembler module 28 can return an empty response such as in the form of a fault response message indicating the failure of the assembler module 28 to identify a response to the request message sent by the message-oriented service.

The assembler module 28 can output the response as a response message to the message-oriented service being tested, and from which the request message originated using a synchronous response and/or an application or interface specific message such as a JMS send message. Alternatively, the assembler module 28 can output the response to a file by writing the response message and/or one or more of the values included therein for a file-based delivery.

By this technology, more effective testing of message-oriented services can be performed in a simulation environment with reduced resources as compared to creating error-prone custom stubs. By generating flat records, responses can be generated for hierarchical request messages irrespective of the type of service being tested from which the request messages are sent. Additionally, by matching key/value pairs to identify request sets and associated responses, the simulation environment can process request messages irrespective of the interface and does not require knowledge of any queries generated by the message-oriented service being tested. As a result, message-oriented services can be tested in a simulation environment when backend systems are unavailable and with reduced susceptibility to error, reduced complexity, and lesser resource allocation as compared to creating and implementing custom test stubs.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for simulating a message-oriented service, the method comprising:
   obtaining, at a simulation computing apparatus, a request message in a hierarchical format;
   generating, with the simulation computing apparatus, a set of flat request records based on the request message, each flat request record includes at least a key and a value;
   comparing, with the simulation computing apparatus, each of the flat request records to a set of criteria records to generate one or more response sets, each of the criteria records includes at least a key, a value, and a response identifier and each of the one or more response sets includes one or more response identifiers;
   applying, with the simulation computing apparatus, one or more rules to the one or more response sets to identify one or more response identifiers;
   retrieving, with the simulation computing apparatus, one or more test data responses corresponding to the one or more identified response identifiers; and
   outputting, with the simulation computing apparatus, one or more response messages including the one or more retrieved test data responses.

2. The method of claim 1 wherein the comparing further comprises populating the one or more response sets with each response identifier of any input flat request record having a key and a value matching the key and the value of any criteria record.

3. The method of claim 1, further comprising:
   obtaining, at the simulation computing apparatus, test data comprising a plurality of requests and a response associated with each of the plurality of requests wherein the test data requests are in a hierarchical format;
   generating, with the simulation computing apparatus, the set of criteria records such that the key and the value of each criteria record is based on one of the test data requests and the response identifier of each criteria record corresponds to the test data response associated with the test data request on which the key and the value of the criteria record is based; and
   storing, with the simulation computing apparatus, the set of criteria records.

4. The method of claim 1 wherein the applying further comprises identifying the one or more response identifiers based on at least one of an exact match of response identifiers included in all the response sets, an intersection of one or more of the one or more non-empty response sets, a result of a Union of one or more of the one or more response sets, or a result of a Set operation performed on the one or more response sets.

5. The method of claim 1 wherein one or more of the values of one or more records of the set of criteria records, which is based on the values of the flat request record, includes a regular expression pattern and wherein the comparing further comprises populating the one or more response sets with each response identifier of any flat request record having a key matching the key of a criteria record and a value satisfying the regular expression of the criteria record.

6. The method of claim 3 further comprising storing, with the simulation computing apparatus, each test data response as associated with a corresponding one of the response identifiers.

7. The method of claim 3 wherein:
   one or more of the criteria records includes a plurality of response part identifiers each corresponding to a portion of the test data response associated with the test data request on which the key and the value of the one or more criteria records is based;
   the retrieving further comprises retrieving a plurality of portions of each of the test data responses corresponding to the response part identifiers; and
   the outputting further comprises assembling the retrieved plurality of portions to generate the one or more response messages.

8. The method of claim 1 wherein the message-oriented service is an Enterprise Java Bean service, a Java (EJB) service, an eXtensible Markup Language (XML) service, a Representational State Transfer (REST) based service, a Web Service, a Java Message Service (JMS) service, a .Net service, or a service configured to output the request message in the hierarchical format.

9. A non-transitory computer readable medium having stored thereon instructions for simulating a message-oriented service comprising machine executable code which when executed by a processor, causes the processor to perform steps comprising:

obtaining a request message in a hierarchical format;

generating a set of flat request records based on the request message, each flat request record includes at least a key and a value;

comparing each of the flat request records to a set of criteria records to generate one or more response sets, each of the criteria records includes at least a key, a value, and a response identifier and each of the one or more response sets includes one or more response identifiers;

applying one or more rules to the one or more response sets to identify one or more response identifiers;

retrieving one or more test data responses corresponding to the one or more identified response identifiers; and outputting one or more response messages including the one or more retrieved test data responses.

10. The medium of claim 9 wherein the comparing further comprises populating the one or more response sets with each response identifier of any flat request record having a key and a value matching the key and the value of any criteria record.

11. The medium of claim 9 further having stored thereon instructions that when executed by the processor cause the processor to perform steps further comprising:

obtaining test data comprising a plurality of requests and a response associated with each of the plurality of requests wherein the test data requests are in a hierarchical format;

generating the set of criteria records such that the key and the value of each criteria record is based on one of the test data requests and the response identifier of each criteria record corresponds to the test data response associated with the test data request on which the key and the value of the criteria record is based; and storing the set of criteria records.

12. The medium of claim 9 wherein the applying further comprises identifying the one or more response identifiers based on at least one of an exact match of response identifiers included in all the response sets, an intersection of one or more of the one or more non-empty response sets, a result of a Union of one or more of the one or more response sets, or a result of a Set operation performed on the one or more response sets.

13. The medium of claim 9 wherein one or more of the values of one or more records of the set of criteria records includes a regular expression pattern and wherein the comparing further comprises populating the one or more response sets with each response identifier of any flat request record having a key matching the key of a criteria record and a value satisfying the regular expression of the criteria record.

14. The medium of claim 11 further having stored thereon instructions that when executed by the processor cause the processor to perform steps further comprising storing each test data response as associated with a corresponding one of the response identifiers.

15. The medium of claim 11 wherein:

one or more of the criteria records includes a plurality of response part identifiers each corresponding to a portion of the test data response associated with the test data request on which the key and the value of the one or more criteria records is based;

the retrieving further comprises retrieving a plurality of portions of each of the test data responses corresponding to the response part identifiers; and the outputting further comprises assembling the retrieved plurality of portions to generate the one or more response messages.

16. The medium of claim 9 wherein the message-oriented service is an Enterprise Java Bean service, a Java (EJB) service, an eXtensible Markup Language (XML) service, a Representational State Transfer (REST) based service, a Web Service, a Java Message Service (JMS) service, a .Net service, or a service configured to output the request message in the hierarchical format.

17. A simulation computing apparatus, comprising:

a processor coupled to a memory and configured to execute programmed instructions stored in the memory comprising:

obtaining a request message in a hierarchical format;

generating a set of flat request records based on the request message, each flat request record includes at least a key and a value;

comparing each of the flat request records to a set of criteria records to generate one or more response sets, each of the criteria records includes at least a key, a value, and a response identifier and each of the one or more response sets includes one or more response identifiers;

applying one or more rules to the one or more response sets to identify one or more response identifiers;

retrieving one or more test data responses corresponding to the one or more identified response identifiers; and outputting one or more response messages including the one or more retrieved test data responses.

18. The apparatus of claim 17 wherein the comparing further comprises populating the one or more response sets with each response identifier of any flat request record having a key and a value matching the key and the value of any criteria record.

19. The apparatus of claim 17 wherein the processor is further configured to execute programmed instructions stored in the memory further comprising:

obtaining test data comprising a plurality of requests and a response associated with each of the plurality of requests wherein the test data requests are in a hierarchical format;

generating the set of criteria records such that the key and the value of each criteria record is based on one of the test data requests and the response identifier of each criteria record corresponds to the test data response associated with the test data request on which the key and the value of the criteria record is based; and storing the set of criteria records.

20. The apparatus of claim 17 wherein the applying further comprises identifying the one or more response identifiers based on at least one of an exact match of response identifiers included in all the response sets, an intersection of one or more of the one or more non-empty response sets, a result of a Union of one or more of the one or more response sets, or a result of a Set operation performed on the one or more response sets.

21. The apparatus of claim 17 wherein one or more of the values of one or more records of the set of criteria records includes a regular expression pattern and wherein the comparing further comprises populating the one or more response sets with each response identifier of any flat request record having a key matching the key of a criteria record and a value satisfying the regular expression of the criteria record.

22. The apparatus of claim 19 wherein:

one or more of the criteria records includes a plurality of response part identifiers each corresponding to a portion of the test data response associated with the test data request on which the key and the value of the one or more criteria records is based;

the retrieving further comprises retrieving a plurality of portions of each of the test data responses corresponding to the response part identifiers; and the outputting further comprises assembling the retrieved plurality of portions to generate the one or more response messages.

23. The apparatus of claim 19 wherein one or more of the criteria records includes a plurality of response identifiers each corresponding to a portion of the test data response associated with the test data request on which the key and the value of the one or more criteria records is based.

24. The apparatus of claim 17 wherein the message-oriented service is an Enterprise Java Bean service, a Java (EJB) service, an eXtensible Markup Language (XML) service, a Representational State Transfer (REST) based service, a Web Service, a Java Message Service (JMS) service, a .Net service, or a service configured to output the request message in the hierarchical format.

* * * * *